United States Patent [19]

Matsumoto

[11] Patent Number: 4,559,256

[45] Date of Patent: Dec. 17, 1985

[54] IMAGE RECEIVING TRANSPARENT BASE FILM

[76] Inventor: Fumio Matsumoto, No. 1-25-54 Nishinogawa, Komae-shi, Tokyo, Japan

[21] Appl. No.: 592,103

[22] Filed: Mar. 22, 1984

[51] Int. Cl.[4] .............................................. B32B 3/10
[52] U.S. Cl. ................................ 428/141; 346/135.1; 428/161; 428/165; 428/215; 428/336; 428/337; 428/480; 428/483; 428/492
[58] Field of Search ................ 427/290; 428/141, 161, 428/165, 195, 480, 483, 492, 215, 336, 337; 346/135.1

[56] References Cited

U.S. PATENT DOCUMENTS

| | | | |
|---|---|---|---|
| 4,233,352 | 11/1980 | Ono et al. | 428/141 |
| 4,332,861 | 6/1982 | Franz et al. | 427/290 |

FOREIGN PATENT DOCUMENTS

| | | |
|---|---|---|
| 33-366 | 1/1958 | Japan . |
| 34-9167 | 10/1959 | Japan . |
| 46-20595 | 6/1971 | Japan . |
| 47-37494 | 9/1972 | Japan . |
| 153836 | 12/1979 | Japan . |
| 822894 | 11/1959 | United Kingdom . |

*Primary Examiner*—George F. Lesmes
*Assistant Examiner*—P. R. Schwartz
*Attorney, Agent, or Firm*—Young & Thompson

[57] ABSTRACT

An improved transparent base film of polyester is disclosed, which on its one surface roughened by sandblasting is provided with a film layer of a rubber material selected from styrene-butadiene rubber, natural rubber, butadiene rubber (BR), isoprene rubber (IR), chloroprene rubber (CR), isobutylene-isoprene rubber (IIR), acrylonitrile-butadiene rubber (NBR), ethylene-propylene-diene rubber (EPDR) and acrylic rubber.

1 Claim, No Drawings

IMAGE RECEIVING TRANSPARENT BASE FILM

FIELD OF THE INVENTION

This invention relates to an improved transparent base film of polyester, which is excellent in its writing, drawing and printing properties.

BACKGROUND OF THE INVENTION

A plastic film, which has been roughened on its surface for imparting an improved writing property thereto, has essential disadvantages, such as blotting of ink, roughness of particles on a written area, difficulty of correcting or erasing the writings, etc., and therefore must be improved in its writing property by incorporating thereinto a roughening agent of fine powder. For example, Japanese Patent 242157 and Japanese Patent Publication 9167/59 describe a plastic film provided with a coating layer comprising a roughening agent and a binder; Japanese Patent Publication 37494/72 discloses a tracing film which is extruded after incorporating a dispersant and a roughening agent into a styrene resin; and British Patent 822894 discloses a coated polyester film in which the polyester film is provided with a polyisocyanate coating on which is formed an organic hydrophilic film containing a roughening agent. Such films incorporated with the roughening agent may be used for blueprinting by utilizing a light reflected from the surface.

On the other hand, a transparent film having writing property without the roughening agent may be used not only for blueprinting due to transmitted light but also for so called PS make-up. For example, Japanese Patent Publication No. 20595/71 describes a method of forming a writable rough surface by utilizing an orange peel phenomenon, or applying a special solution of vinylidene chloride/acrylic ester compolymer onto a polyester film, which is then dried.

It has now been found, after having studied a transparent base film having an excellent writing property without using a conventional specific resin and a roughening agent, that roughening treatment of a polyester film by sand-blasting and formation of a film layer of styrene-butadiene rubber thereon may impart an excellent writing property to the film layer free of intrinsic writability, resulting in several advantages in that the writing property is distinct from that of the original rough surface, that particles of a pencil writing become fine, that deposition and absorption of ink may be good and that a clear picture may be achieved. It has further been found that the advantages just described may be also achieved by using, in lieu of the styrene-butadiene rubber, a rubber material selected from natural rubber, butadiene rubber (BR), isoprene rubber (IR), chloroprene rubber (CR), isobutylene-isoprene rubber (IIR), acrylonitrile-butadiene rubber (NBR), ethylene-propylene-diene rubber (EPDR) and acrylic rubber. It has not been determined why the excellent writing property is achieved. Probably, transfer of the rough surface of the polyester film to the film layer of the rubber material, as well as effects of elasticity and frictional coefficient of the rubber material may produce the unexpected writing property.

SUMMARY OF THE INVENTION

A general object of the invention is to provide a transparent polyester base film without a roughening agent but having an excellent writing property.

Another object of the invention is to provide a transparent base film having an excellent writing property by using cheap rubber materials which may be commercially available.

A further object of the invention is to provide a transparent base film which may be applied for blueprinting with transmitted light and for the PS make-up.

The above object may be achieved, in accordance with the invention, by providing a transparent base film of polyester on its one surface roughened by sand-blasting with a film layer of the rubber material selected from a group consisting of styrene-butadiene rubber, natural rubber, butadiene rubber (BR), isoprene rubber (IR), chloroprene rubber (CR), isobutylene-isoprene rubber (IIR), acrylonitrile-butadiene rubber (NBR), ethylene-propylene-diene rubber (EPDR) and acrylic rubber.

PREFERRED EMBODIMENTS OF THE INVENTION

In order to use the film in blueprinting or PS make-up, the polyester film is preferably of $25\pm5\mu$ thickness but is not limited thereto. The film layer of natural or synthetic rubber material as defined herein may be formed by dissolving the selected rubber in a volatile organic solvent and applying the resulting solution on the rough surface of the film layer, which is then dried.

The invention will now be described with non-limiting examples hereinbelow.

EXAMPLE 1

A tetron film (tradename of polyethylene-terephthalate film) of $25\mu$ thickness was frosted on its one surface by sand-blasting with an abrasive of about 400 mesh. The resulting roughness was of the order of $5-6\mu$. Then, a 5% solution of JSR 1000 (styrene-butadiene rubber supplied by Nippon Synthetic Rubber Co., Ltd.) in cyclohexane was uniformly applied thereon, which was then dried in air. Thus, a styrene-butadiene rubber layer of about $2-3\mu$ was formed.

The resulting rubber face may be readily written on with a pencil. Observation of 100-fold enlarged written area shows that particles of the pencil are equal in fineness to those on a tracing film of a high grade. Furthermore, the writing may be readily erased with a rubber eraser.

Typewriting may be very clear and vivid and may be readily erased with a cotton applicator impregnated with toluol.

Furthermore, it has been found that writing with a ballpoint pen, a fountain pen, a rubber stamp, and printing with a printing ink, as well as Zerox copies may provide clear and vivid pictures.

EXAMPLE 2

A tetron film as described in Example 1 on its one surface was treated in the same way as Example 1 to provide roughness of about $5-6\mu$. Then, a 5% solution of natural rubber in cyclohexane was uniformly applied thereon, which was then dried in air to form a rubber layer of about $2-3\mu$.

EXAMPLE 3

The procedure of Example 1 was repeated except for replacing the styrene-butadiene rubber with Nippol BR (butadiene rubber supplied by Nippon Zeon Co., Ltd.) to give a transparent base film having the same performance as in Example 1.

EXAMPLE 4

The procedure of Example 1 was repeated except for replacing the styrene-butadiene rubber with Nippol IR (isoprene rubber supplied by Nippon Zeon Co., Ltd.) to give a transparent base film having the same performance as in Example 1.

EXAMPLE 5

The procedure of Example 1 was repeated except for replacing the styrene-butadiene rubber and the solvent cyclohexane with neoprene (chloroprene rubber supplied by Du Pont De Nemours Co., Ltd.) and toluol, respectively, to give a transparent base film having the same performance as in Example 1.

EXAMPLE 6

The procedure of Example 1 was repeated except for replacing the styrene-butadiene rubber with Essobutyl (isobutylene-isoprene rubber supplied by Esso Chemical Co., Ltd.) to give a transparent base film having the same performance as in Example 1.

EXAMPLE 7

The procedure of Example 1 was repeated except for replacing the styrene-butadience rubber with chemirubber (acrylonitrile-butadiene rubber supplied by Goodyear Tire And Rubber Co., Ltd.) to give a transparent base film having the same performance as in Example 1.

EXAMPLE 8

The procedure of Example 1 was repeated except for replacing the styrene-butadiene rubber with Esprene (etylene-propylene-diene rubber supplied by Sumitomo Chemicals Co., Ltd.) to give a transparent base film having the same performance as in Example 1.

EXAMPLE 9

The procedure of Example 1 was repeated except for replacing the styrene-butadiene rubber with thermotite acrylic rubber supplied by Nippon Oil Seal Industry Co., Ltd.) to give a transparent base film having the same performance as in Example 1.

The transparent base film according to the invention may be readily prepared by using commercially available materials of low cost, may provide clear and vivid pictures with a pencil, a type-writer, printing or a Zerox copy, may be erased or corrected by a suitable solvent, and may be preferably used for blueprinting or PS make-up using transmitted light.

Although the invention has been described hereinabove with reference to preferred embodiments, many modifications and variations may be made without departing from the scope and spirit of the invention; for example, an antistatic agent may be applied on one or either side of the film.

What is claimed is:

1. A thin transparent flexible base film of polyester writing material having a thickness of about $25\pm5\mu$, having one surface roughened by sand-blasting to a roughness of about $5-6\mu$, and having on said roughened surface a film layer about $2-3\mu$ thick of a rubber material selected from styrene-butadiene rubber, natural rubber, butadiene rubber (BR), isoprene rubber (IR), chloroprene rubber (CR), isobutylene-isoprene rubber (IIR), acrylonitrile-butadiene rubber (NBR), ethylene-propylene-diene rubber (EPDR) and acrylic rubber, said roughened and coated surface being capable of receiving a written or printed image.

* * * * *